United States Patent
Lou et al.

(10) Patent No.: US 9,713,097 B2
(45) Date of Patent: Jul. 18, 2017

(54) ADAPTIVE SINR CONTROL

(71) Applicant: AT&T Intellectual Property I, L.P., Atlanta, GA (US)

(72) Inventors: Yuang Lou, Dunwoody, GA (US); Neale C. Hightower, Sr., Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/500,310

(22) Filed: Sep. 29, 2014

(65) Prior Publication Data

US 2015/0018033 A1 Jan. 15, 2015

Related U.S. Application Data

(62) Division of application No. 12/323,184, filed on Nov. 25, 2008, now Pat. No. 8,849,335.

(51) Int. Cl.
| | |
|---|---|
| *H04W 52/24* | (2009.01) |
| *H04W 88/08* | (2009.01) |
| *H04W 24/02* | (2009.01) |
| *H04B 1/10* | (2006.01) |

(52) U.S. Cl.
CPC .......... *H04W 52/241* (2013.01); *H04B 1/109* (2013.01); *H04W 24/02* (2013.01); *H04W 88/08* (2013.01)

(58) Field of Classification Search
CPC .... H04W 52/241; H04W 24/02; H04W 88/08
See application file for complete search history.

(56) References Cited

U.S. PATENT DOCUMENTS

| | | | | |
|---|---|---|---|---|
| 5,203,027 | A * | 4/1993 | Nounin | H04B 7/082 375/231 |
| 5,845,199 | A * | 12/1998 | Longshore | H04H 20/67 455/133 |
| 6,125,138 | A * | 9/2000 | Kumagai | H04L 5/16 370/277 |
| 7,352,226 | B2 | 4/2008 | Dwelly et al. | |
| 7,359,729 | B2 | 4/2008 | Ben Rached et al. | |

(Continued)

OTHER PUBLICATIONS

HMPP-386x Series MiniPak Surface Mount RF PIN Diodes, Avago Technologies Data Sheet, Nov. 24, 2008, 10 pages.

*Primary Examiner* — Bobbak Safaipour
(74) *Attorney, Agent, or Firm* — Zagorin Cave LLP

(57) ABSTRACT

An adaptive SINR control process is triggered based on various quality measures associated with the received signal in a mobile device or on a geographic region in which a base station and an interferer are located. As part of the adaptive SINR control process, the mobile device reduces the signal level of the received signal, which reduces both the signal strength of the desired signal and the interfering signal. If the control process is triggered on the mobile device side, after detecting the presence of interference, the mobile device sends a request that the base station increase its transmit power of the desired signal to improve the receiving SINR in the mobile device. Alternatively, the mobile device may receive information from the base station causing the mobile device to reduce the signal level of the received signal based on quality indicators sent by the mobile device to the base station or based on geographic location of the base station.

21 Claims, 4 Drawing Sheets

(56) References Cited

U.S. PATENT DOCUMENTS

| | | | |
|---|---|---|---|
| 7,415,246 B2 | 8/2008 | Kim et al. | |
| 7,454,222 B2* | 11/2008 | Huang | H04L 1/0003 455/226.1 |
| 8,849,335 B2* | 9/2014 | Lou | H04B 1/109 455/522 |
| 2002/0055342 A1* | 5/2002 | Walley | H04B 1/1027 455/226.2 |
| 2003/0002462 A1* | 1/2003 | Tanoue | H04W 24/00 370/335 |
| 2003/0069043 A1* | 4/2003 | Chhaochharia | H04W 16/28 455/561 |
| 2004/0038699 A1* | 2/2004 | Toono | H04W 52/12 455/522 |
| 2004/0242218 A1* | 12/2004 | Saito | H04W 36/30 455/421 |
| 2005/0088961 A1* | 4/2005 | Tellado | H04L 25/03006 370/210 |
| 2006/0035660 A1* | 2/2006 | Anderson | H04W 52/06 455/522 |
| 2006/0068826 A1* | 3/2006 | Leonard | H04W 52/12 455/522 |
| 2006/0116153 A1* | 6/2006 | Sugiyama | H04W 52/48 455/522 |
| 2006/0223447 A1* | 10/2006 | Masoomzadeh-Fard | H04W 52/362 455/69 |
| 2007/0230547 A1* | 10/2007 | Asai | H04B 1/525 375/219 |
| 2007/0232346 A1* | 10/2007 | Takano | H04W 52/40 455/522 |
| 2007/0270151 A1* | 11/2007 | Claussen | H04W 16/32 455/444 |
| 2008/0130593 A1* | 6/2008 | Scheinert | H04W 8/30 370/337 |
| 2008/0198955 A1* | 8/2008 | Oren | H04B 7/0874 375/347 |
| 2009/0138778 A1* | 5/2009 | Jugl | H04W 52/48 714/749 |
| 2009/0179740 A1* | 7/2009 | Pillai | H04B 5/0062 340/10.1 |
| 2009/0197590 A1* | 8/2009 | Borran | H04W 52/242 455/423 |
| 2010/0009625 A1* | 1/2010 | Chami | H04B 7/15535 455/11.1 |
| 2010/0197363 A1* | 8/2010 | Sorensen | H04B 15/02 455/570 |
| 2010/0302956 A1* | 12/2010 | Haverty | H04K 3/22 370/252 |
| 2010/0311423 A1* | 12/2010 | Saito | H04W 36/30 455/440 |
| 2011/0286371 A1* | 11/2011 | Yellin | H04B 7/0647 370/281 |
| 2012/0140852 A1* | 6/2012 | Kato | H03F 1/30 375/298 |
| 2013/0114569 A1* | 5/2013 | Anderson | H04W 52/06 370/335 |

* cited by examiner

ADAPTIVE SINR CONTROL

CROSS-REFERENCE TO RELATED APPLICATION(S)

This application is a divisional of U.S. patent application Ser. No. 12/323,184, filed Nov. 25, 2008, entitled "Adaptive SINR Control", naming Yuang Lou et al. as inventors, which application is hereby incorporated by reference herein.

BACKGROUND

Field of the Invention

This invention relates to interference in radio networks and more particularly to reducing the effects of interference during communication sessions between a base station and a mobile device.

Description of the Related Art

As cellular and Internet communication services continue to reach into more aspects of life, mobile voice (cellular), mobile broadband data and quadruple-play (voice, data, video and mobility) multimedia services, are expected to dominate future wireless markets. All these diversified mobile broadband services share radio frequency (RF) resources, Along with the growth of mobile broadband services under limited RF resources, RF service systems are being deployed in physical proximity and share adjacent RF bands. These neighboring systems and RF equipment have an increased potential to impact each other through in-band and out of band interference. An undesired signal sourced from a neighboring RF system that exceeds certain critical levels and that is received by an RF receiver can lead to overload, intermodulation, dynamic range reduction and a noise floor rising of more than 1 dB. In the cases of dynamic range reduction, adaptive modulation schemes can be adopted to improve service performance at the receiving device, or at least, to minimize undesired link errors by reducing link capacity. This potential problem becomes progressively harder to resolve when the undesired signal is much stronger, e.g., when exceeding the desired signal by an order of magnitude, and/or the receiving device only plays a passive role within the loop of interference control.

Interference issues can be generally classified into two generic categories. One category is called inter-cell interference, and the other is called inter-system interference. Increased deployment of different wireless services in the same location and/or operating in adjacent frequency bands, can lead to increased problems with both increased inter-cell and inter-system interference.

Inter-system interference has typically been managed through RF system planning that follows Federal Communication Commission (FCC) license requirements. In addition, inter-system interference can be managed by agreement(s) negotiated among service providers. When there are only a few RF service systems deployed in the same physical location and operated in adjacent RF frequency bands, the inter-system interference is usually minor and can be managed through system planning and by negotiated service agreements. Unique interference issues can be worked out on a case-by-case basis among affected parties.

Due to diversified service growth and development in RF communications, the current approaches to managing inter-system interference may be inadequate. As RF radio hands become occupied and wireless resources become more congested, RF base stations are deployed in close proximity to each other. The RF service environment is becoming more and more traffic/interference limited. Under this tightened RF resources condition, it becomes more likely that adjacent RF service systems will operate under a power disparity environment to provide for different service requirements. When the received power at a handset or base station from an undesired signal is significantly increased, the receiving device may be overloaded, and driven into a nonlinear operating range.

For example, in the S band operation, Wireless Communication Channels (WCS) are assigned between 2.305 GHz-2.315 GHz and 2.345 GHz-2.36 GHz bands. Satellite Digital Audio Radio Services (SDARS) operators are assigned the spectrum between 2.315 GHz and 2.345 GHz and thus, WCS and SDARS operations are in adjacent frequency bands. Meanwhile, WCS base stations and SDARS ground repeaters could also be deployed to the same metropolitan area where the WCS base station transmitter is limited by 2 KW Equivalent isotropically Radiated Power (EIRP) and SDARS ground repeater transmission can run EIRP up to 40 KW. Such an environment demonstrates a typical inter-system interference scenario including potential for overload, intermodulation, dynamic range reduction, as well as other forms of interference due to the high power disparity.

The Federal Communication Commission (FCC) spectrum auction in 700 MHz frequency range provides another potential interference scenario. For example, one-way digital video service system and 2-way mobile data service system, both running in neighboring bands of 700 MHz, could be deployed to the same metropolitan area. One-way digital video service base station transmitters can run up to 82 KW EIRP and 2-way mobile data service base station transmitters are limited to 1.6 KW EIRP. Once these two RF service systems are deployed adjacent to each other in the neighboring RF bands, a significant inter-system interference impact is possible through overload, intermodulation, dynamic range reduction as well as other forms of interference due to the high power disparity.

In addition to system planning to avoid high power disparity or otherwise plan for it, there are a variety of methods for mitigating interference impact at the device level. For example, receive filters can be used to mitigate the interference by selectively reducing the strength of the desired versus the undesired signals based, assuming the undesired signals are of different frequency. However, filters that separate signals at adjacent frequency bands can be difficult to build. Further, even when a technical solution is available, the limitations of cost and size might prevent incorporation into customer devices.

As diversified growth and development in RF communications continues, the current approaches to managing inter-system interference may be inadequate. Accordingly, improved approaches to the problems of inter-system interference are desirable.

SUMMARY

Embodiments of the invention directly address the interference issue and provide improvement in signal to interference plus noise ratio (SINR), which is the ratio of the received signal strength of the desired signal to the received signal strength of undesired signals (noise and interference). SINR improvement is achieved in a cost-effective fashion to minimize both inter-cell and inter-system interference at the device level and increase the desired signal adaptively at the same time without the necessity for expensive and physically large filters.

Accordingly, in one embodiment a method is provided that includes, determining at a mobile device presence of interference from an interfering signal in a received signal, the received signal including a desired signal and the interfering signal, and in response to determining the presence of interference from the interfering signal, sending a request to an assigned base station of the mobile device to increase transmission power of the desired signal. The method further includes reducing a signal level of the received signal at the mobile device, e.g., by adjusting receiver gain and/or by inserting attenuation.

In another embodiment, a method is provided for adaptive SINR control that includes sending control information from a base station to a mobile device requesting that the mobile device reduce the signal strength of the received signal, by, e.g., reducing its receiver gain and/or inserting attenuation, the received signal including a desired signal and an interfering signal, whose signal strength will both be reduced simultaneously, and subsequently increasing transmission power of the desired signal in the base station. The method may include the base station sending the control information to the mobile device responsive to geographic location of the base station in proximity to a known interfering transmitter transmitting the interfering signal or in response to the base station receiving from the mobile device a real-time indication of quality in the received signal.

In an embodiment, a mobile device is provided that includes an interference detector coupled to detect the presence of interference in a received signal at the mobile device, the received signal including a desired signal and an interfering signal. The mobile device is further responsive to the detection of the presence of interference to send to an assigned base station a request that the assigned base station increase its transmission power of the desired signal. The mobile device is coupled to reduce the signal strength of the received signal, by, e.g., reducing its receiver gain and/or inserting attenuation, the received signal including a desired signal and an interfering signal, the signal level being reduced to correspond to the request to the base station. The reduced signal strength of the received signal combined with the increased transmission power of the desired signal thereby increases the SINR of the mobile received signal.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
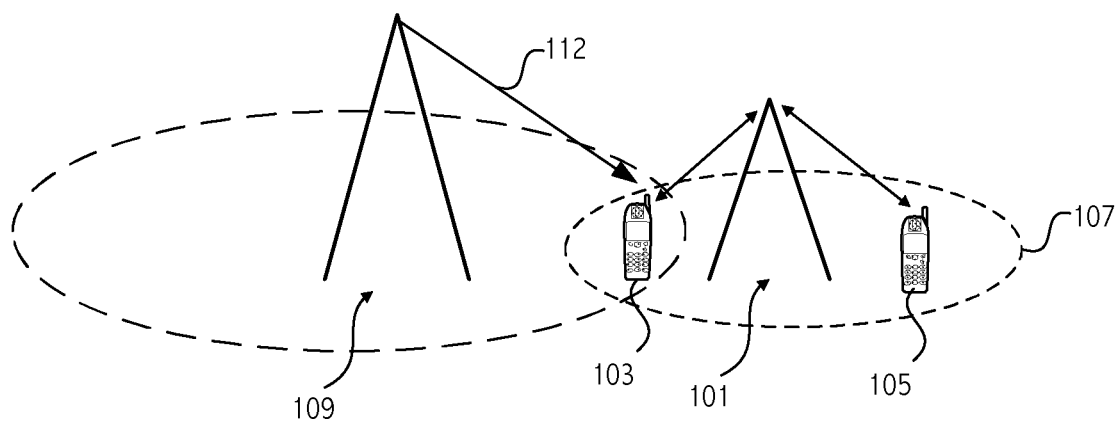
FIG. 1 illustrates an environment in which embodiments of the invention can be advantageously employed to reduce interference between selected devices and a base station.

FIG. 1 illustrates an environment in which embodiments of the invention can be advantageously employed to reduce interference between selected devices and a base station. As shown in FIG. 1, a base station 101 is in communication with mobile device 103 and mobile device 105 in cell area 107. A high powered transmitter 109 transmits an undesired interference signal 112 that impacts communication between mobile device 103 and base station 101. Thus, the mobile device 103 receives both a desired signal transmitted by the base station 101 and an undesired or interfering signal transmitted by the interfering transmitter 109. According to an embodiment of the invention, an adaptive power control process is implemented in response to detection or knowledge of the presence of the undesired interfering signal to improve the SINR for communications between base station 101 and mobile device 103. Note that communications between base station 101 and mobile device 105 are not impacted by the high powered transmitter 109 since the interference level from the interfering transmitter is low. Thus, communications with normal power transmission levels from the base station may continue unchanged.

Figure 2:
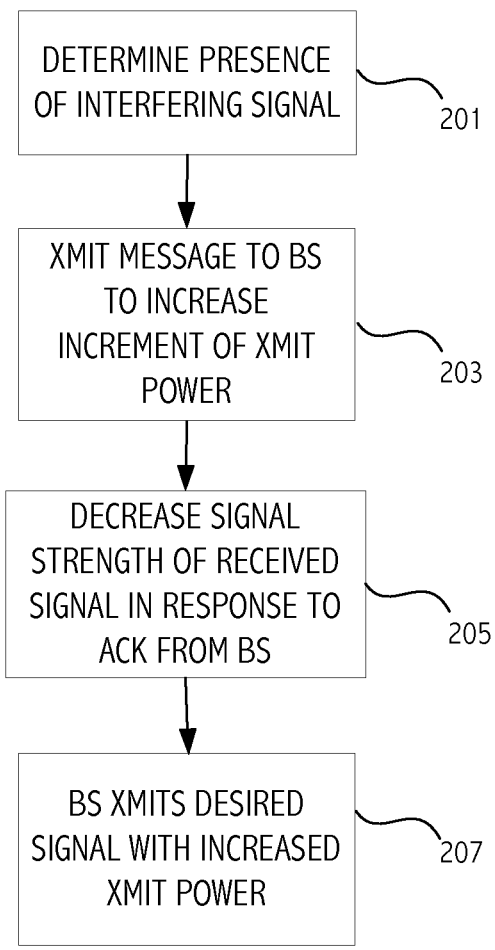
FIG. 2 illustrates a high level flow diagram of adaptive SINR control according to an embodiment of the invention.

FIG. 2 illustrates a high level flow diagram of an embodiment of the invention. The mobile device 103 detects the presence of the interfering signal in 201. The presence of the interfering signal may be determined by evaluating quality indicators of the received signal such as the signal to noise ratio and block error rate (BLER) in the mobile device. Those values are readily accessible in most modern digital receivers, which calculate a signal to noise ratio and measure BLER instantaneously. Either or both of the measured signal to noise ratio and BLER are compared to appropriate thresholds. If, e.g., the signal to noise ratio falls below a threshold and/or the BLER exceeds a threshold, an interfering signal is determined to be present.

In another embodiment, the adaptive SINR control process is triggered by sensing the received signal level. Interference from an undesired signal can cause receiving overload. Sensing the received signal level is well known in the art. Once the overload happens, the adaptive SINR control process is triggered. Various embodiments can use any or all of the BLER, SINR, and signal level sensing as an indicator of the presence of an interfering signal to trigger the SINR control process. Note that SINR and Signal to Noise Ratio (SNR) are often used interchangeably and represent the ratio of the desired signal to the interfering signal. While SINR is used herein, it is intended to cover the ratio of the desired signal to the interfering signal whether it is referred to as SINR, SNR, or by sonic other acronym.

In response to determining the presence of the interfering signal in 201, at 203 the mobile device sends a message to the base station 101 requesting that the base station transmit the desired signal with more power. Once the message is received by the base station and positively acknowledged to the requesting mobile device, the mobile device at 205 reduces the signal strength of the received signal, by, e.g., reducing its receiving gain and/or inserting attenuation, which reduces both the strength of the desired and the undesired signal. Meanwhile, in 207 the base station transmits the desired signal with more power. By the above interactions between the base-station and mobile device, increasing the power of the transmitted desired signal, reducing the signal strength of the received signal, while the power of the transmitted undesired signal is unchanged, the mobile device has improved the SINR of the received signal during the communication session with the base station, At the same time, by reducing the signal strength of the received signal, by, e.g., reducing its receiving gain and/or inserting attenuation, the mobile device may also reduce overload or intermodulation impacts. If the base station does not support adaptive SINR control, the base station sends a message indicating it does not support adaptive SINR control or fails to acknowledge the request at all. In either case, the mobile device can exit the SINR control process it is running if the base station does not support adaptive SINR control.

In an embodiment, the base station at 207 may delay a short period of time after sending the positive acknowledgement to the mobile device before transmitting the desired signal with increased power to allow the mobile device to take appropriate action to reduce its receiver gain or insert attenuation. Note that the signaling protocols are exemplary and other signaling protocols may be implemented between the base station and the mobile device.

In an embodiment of the invention, the base station can transmit the desired signal at multiple increments of power. Each time the mobile station determines from measured quality indicators the detrimental presence of the interfering signal, the mobile device can request an additional increment of transmit power of the desired signal. For each request to increase the transmit power by an increment, the mobile device further reduces the signal strength of the received signal.

Figure 3:
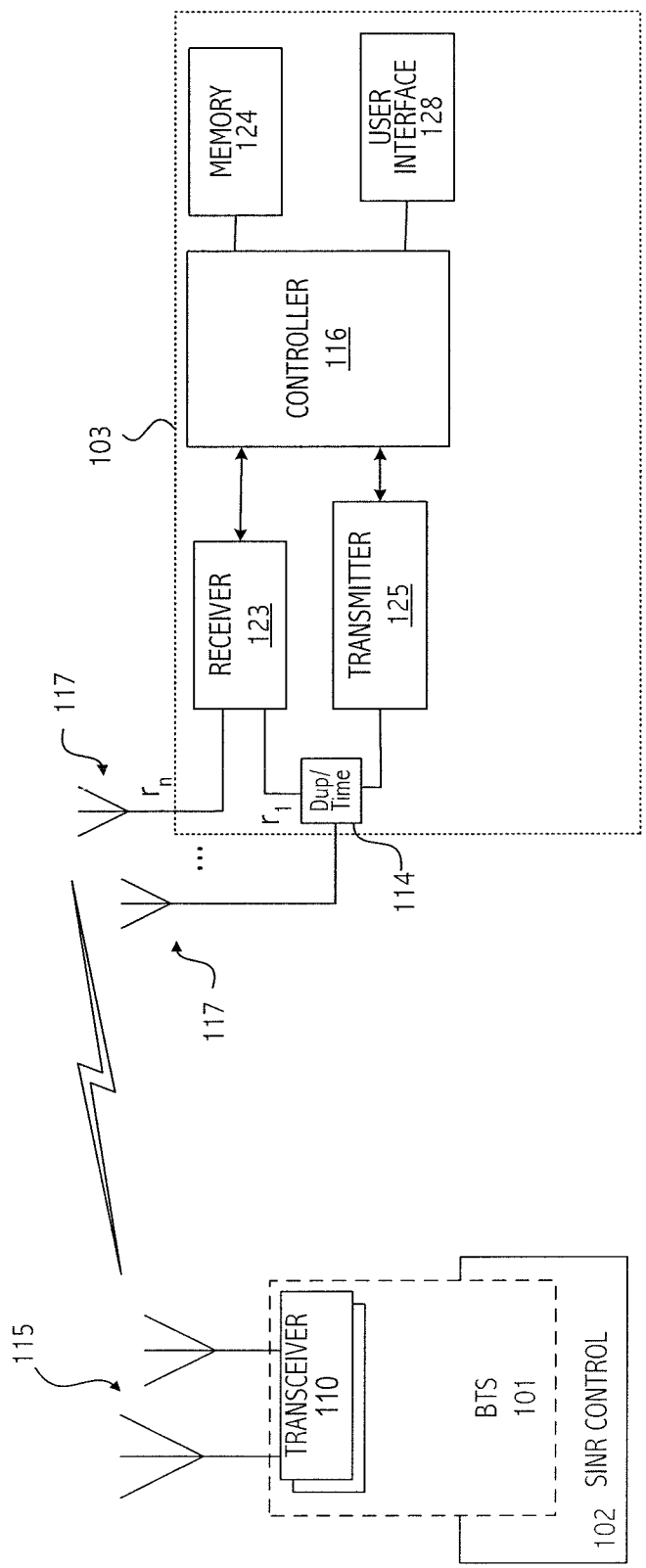
FIG. 3 illustrates additional details of the base station and mobile device shown in FIG. 1.

FIG. 3 illustrates additional details of the base station and mobile device shown in FIG. 1. The exemplary wireless system includes the base station 101 (also referred to herein as base transceiver station (BTS) having one or more cellular antenna transceivers 110 and antennas 115 in communication with a mobile device 103 with one or more antennas 117. The base station and its associated electronics, computer control, antenna arrays and software to operate in accordance with appropriate telecommunications protocols (e.g., modulation, multiplexing, signal processing etc.) are well known in the art although functionally some of those components have been modified or enhanced as described herein with respect to the present invention. The base station is assumed to communicate in one or more of various cellular wireless technologies, e.g., GSM, EDGE, 3GPP LTE, 3GPP UMTS, or UMB, to the mobile devices. However, other communication protocols may also be used and various embodiments of the invention may be applicable to various other wireless communications, e.g., various kinds of wireless access points.

The components of the exemplary mobile device 103 are either generally known in the art or based on those generally known in the art, although functionally some of those components have been modified or enhanced as described herein with respect to the present invention. Transmitter 125 is coupled to utilize antenna 117 through Duplexer/Time switch element 114. The mobile device 103 includes a controller 116, such as a microprocessor, microcontroller or similar data processing device that executes program instructions stored in a memory 124. As known in the art, each of the multiple antennas 117 may receive independent and separate representations of the signal transmitted from transceiver 110. The use of both received signals to reproduce the transmitted signal allows the receiver 123 to produce a more accurate representation of the transmitted signal. It should be appreciated that any number of multiple antennas 117 may be used without departing from the scope of this invention. Typical receiver functions, which are well known in the art and therefore not shown in any detail, include, e.g., intermediate frequency to baseband conversion, demodulation, constellation demapping, decoding, and/or descrambling according to the particular RF protocols and technology being employed. The receiver functions may be implemented in various combinations of analog and digital logic.

The memory 124 may be implemented using any appropriate combination of alterable, volatile or non-volatile memory or non-alterable, or fixed memory. The alterable memory, whether volatile or non-volatile, may be implemented using any one or more of static or dynamic RAM, a floppy disk and disk drive, a writable or re-writable optical disk and disk drive, a hard drive, flash memory or other alterable memory components known in the art. Similarly, the non-alterable or fixed memory may be implemented using any one or more of ROM, PROM, EPROM, EEPROM, an optical ROM disk, such as a CD-ROM or DVD-ROM disk, and disk drive or other non-alterable memory known in the art.

The controller 116 may be implemented as a single special purpose integrated circuit (e.g., ASIC) having a main or central processor unit for overall, system-level control, and separate sections dedicated to performing various specific computations, functions and other processes under the control of the central processor unit. The controller 116 can also be implemented as a single microprocessor circuit, DSP, or a plurality of separate dedicated or programmable integrated or other electronic circuits or devices, e.g., hardwired electronic or logic circuits such as discrete element circuits or programmable logic devices. The controller 116 may also include other circuitry or components, such as memory devices, relays, mechanical linkages, communications devices, drivers and other ancillary functionality to affect desired control and/or input/output functions.

The controller 116 is operatively coupled with user interface 128. The user interface 128 may include items known in the art, such as a display, keypad, speaker, microphone, and other user interface I/O components. The controller 116 provides functionality to achieve adaptable SINR control according to one or more embodiments of the invention, which will be discussed in greater detail below. On the base station side, a SINR control function 102 is provided in the base station, or in a control location in communication with the base station, to implement adaptive SINR functionality according to one or more embodiments of the invention.

Figure 4:
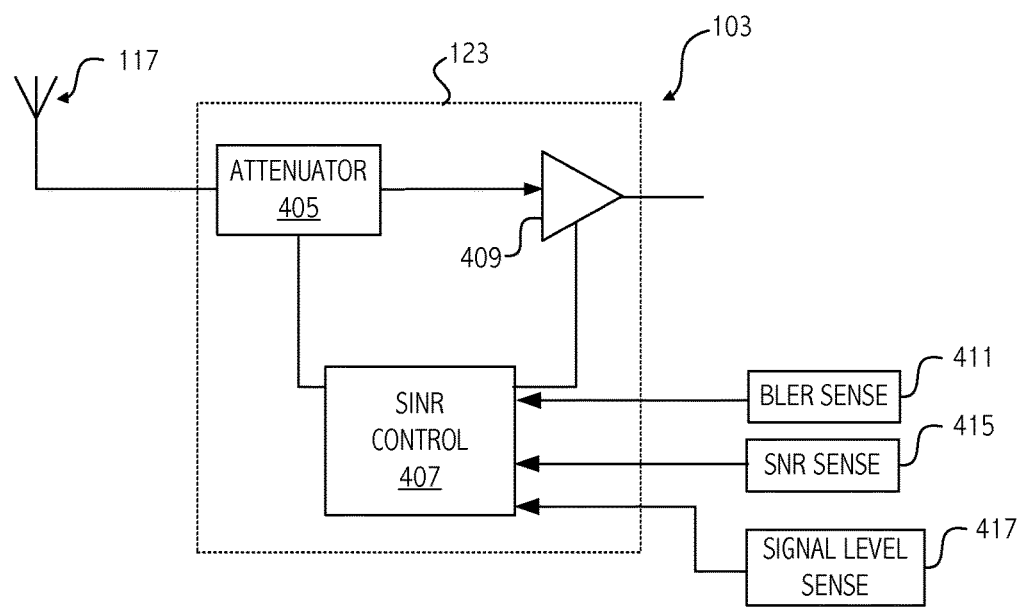
FIG. 4 illustrates additional details of the mobile device shown in FIG. 3.

Referring to FIG. 4, illustrated are additional details of exemplary mobile device 103 that is capable of operating in accordance with one or more embodiments of the present invention. FIG. 4 illustrates the front end of the RF receiver 123 that receives the signal from antenna 117. Note that only one antenna is shown for ease of illustration and that some embodiments may have multiple antennas. Interposed between the antenna 117 and the amplifier 409 is an attenuation block 405 that can be selectively invoked by control logic 407 based on initiating the adaptive SINR control process. Thus, for example, assuming in FIG. 2, that step 203 is reached indicating that the SINR control process has been triggered, then the control logic in 407 can activate the attenuation block 405 to reduce the signal strength of the received signal according to the increment of increased power requested. Thus, in an embodiment various levels of attenuation may be provided by attenuation block 405 and controlled by control logic 407. Overload and intermodulation impacts can be reduced by inserting attenuation to the transmission line between the antenna and the first RF amplifier stage of the receiver due to the lower input signal. However, since both desired and undesired signals are reduced by the same amount of attenuation, the signal-to-noise ratio in the receiving device remains unchanged absent increased transmission power by the base station of the desired signal. Both analog and digitally controlled attenuators are well known in the art. For example, PIN diode(s) may be utilized in an embodiment of the invention to provide controllable attenuation.

In an alternative embodiment, in addition to, or instead of reducing the signal level by attenuating the received signal in attenuation block 405, the signal level may be reduced by reducing the gain of amplifier 409 in response to activation of the SINR control process. Thus, for example, assuming in FIG. 2, that step 203 is reached, the SINR control logic in 407 can reduce the gain in amplifier 409 by an amount corresponding to the increment of increased transmit power requested by the mobile device. Note that in either embodiment shown in FIG. 3, the levels of both the undesired and desired signals are reduced before down conversion in additional processing stages (not shown) of the receiver.

In an embodiment that employs receive diversity, reducing the signal level can also be accomplished by turning off (or ignoring) one or more diversity branches in the mobile device, or by selecting a branch that has a lower signal. It may be preferable to adjust the gain or attenuation of one or more of the receive paths.

Note also that while the SINR control block 407 is shown as a single block for convenience of illustration, in an actual implementation the control functionality may be part of the control functionality in controller 116 (FIG. 3) and may be distributed through various analog, digital, and software functionality, and various combinations thereof known to those of skill in the art. Thus, for example, the control functionality may be implemented partly in a microcontroller in which software is executed to cause digital or analog signals to reduce the received signal level in response to beginning the SINR control process. In addition, the SINR control block also determines based on quality measures from BLER sense block 411, SINR sense block 415, and/or signal level sense block 417 or other quality measures, whether to initiate the SINR control process, based e.g., on software executing in controller 116 to compare the measured values to corresponding threshold values stored in memory 124. Note that while quality measures are shown as separate blocks for convenience, they may be implemented, at least in part, as part of the controller block 116. In addition to triggering the adaptive SINR control process, the SINR control functionality also is responsible for communicating to the base station the request for increased transmit power and the level of increment desired.

Thus, an adaptive SINR control loop operates in the mobile device to detect the presence of an interfering signal based on various quality measures associated with the received signal, reduce the signal level of the received signal, and send one or more requests that the base station transmitter increases its power to improve the receiving SINR in the mobile device according to the base station's capability of adaptively raising its power to the desired level. Note that transmitters of the undesired signal are not affected as their transmitted signal level remains unchanged. Further, referring to FIG. 1 again, communication sessions between the base station 101 and other devices (such as mobile device 107), which are not impacted by the interference, are not affected by the adaptive SINR control process implemented for a communication session between base station 101 and mobile device 103. Thus, such communication sessions can continue with normal power transmissions of the desired signal while increased power transmissions are occurring with the communication session between base station 101 and mobile device 105.

Figure 5:
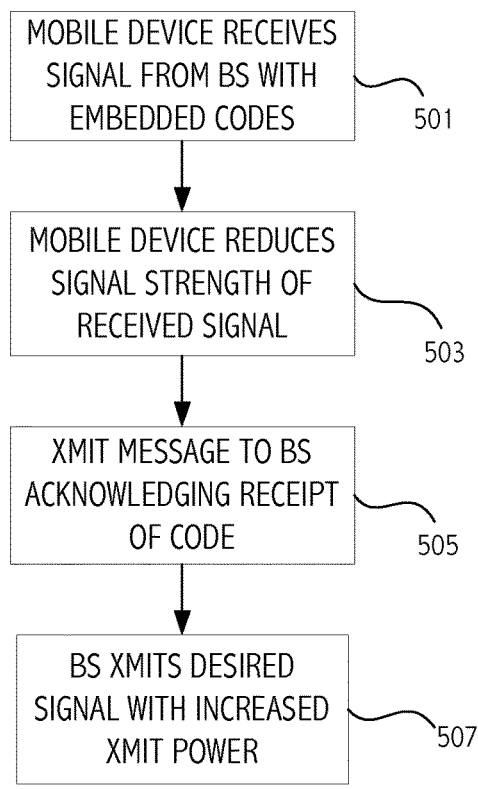
FIG. 5 illustrates a high level flow diagram of adaptive SINR control according to an embodiment of the invention in which codes indicating presence of an interferer are transmitted by the base station.

The adaptive SINR control process can be triggered in several possible ways. One or more of the triggering mechanisms may be present in various embodiments of the invention. One trigger is described above in which the mobile device detects the presence of an interfering signal based on one or more measured quality factors. In an embodiment the SINR control process can be triggered by geographic location. If one (or more) high-powered interfering transmitter(s) are located in a fixed and known site, nearby cellular sites transmitting desired signals are similarly in known fixed locations. Unique cellular site identity codes are embedded in desired transmission signals or otherwise associated in control communications associated with the desired transmission signals. These codes indicate the presence of those high-powered stations in the vicinity that transmit undesired signals causing interference to the cellular mobile devices. Those codes can be used to trigger the adaptive SINR control process to improve receiving SINR adaptively. Thus, referring again to FIGS. 1 and 5, the mobile station 105 receives in 501 a desired signal transmitted from base station 101. Embedded in the desired signal transmitted by the base station or in an associated control communication is a code indicating the presence of one or more high powered interfering transmitters and indicating that adaptive SINR control is available from the base station. In response to the embedded code the mobile device reduces the strength of the received signal by reducing the gain or otherwise attenuating the signal in 503, and acknowledges receipt of the code in 505. In response to receipt of the acknowledgment, the base station transmits the desired signal with increased power in 507.

Figure 6:
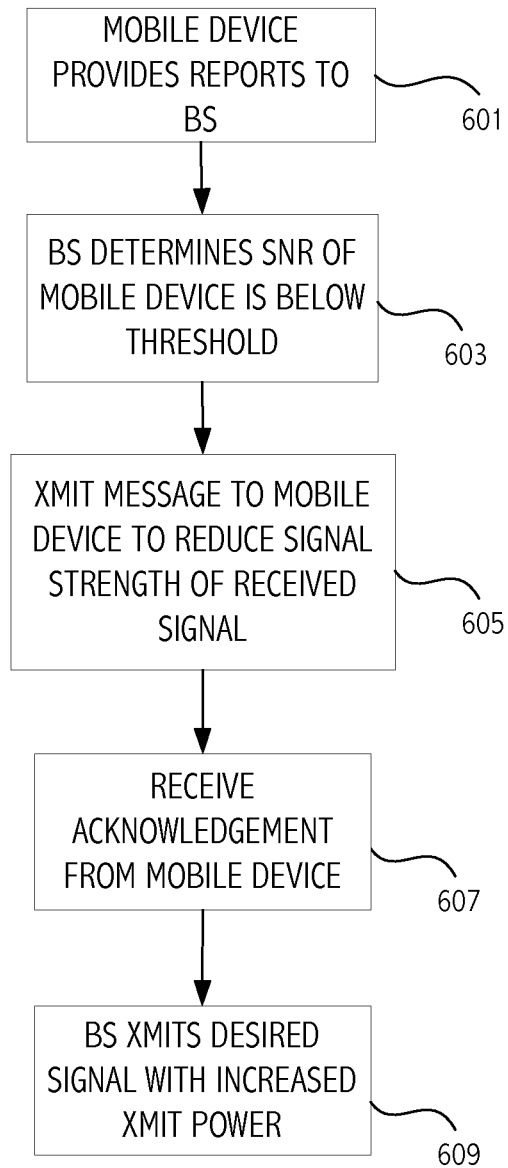
FIG. 6 illustrates a high level flow diagram of adaptive SINR control according to another embodiment of the invention.

Referring to FIGS. 1 and 6, in another embodiment, through its uplink to base station 101, mobile device 105 provides base station 101 with the BLER and/or the signal to noise ratio data from the mobile device in 601. Embodiments may provide the received signal level as well or instead of other quality measurements. When the receiving BLER is too high and/or the received RF signal level is too high. and/or the signal to noise ratio is too low in the mobile device, it indicates the mobile receiving SINR is potentially low. Once the quality measures indicate the presence of an interfering signal at 603, the SINR control function at the base station is triggered and the base station transmitting the desired signal sends a message in 605 instructing the mobile device running in the same session to attenuate all received signals in the receiving device by $X_1$ dB. That instruction can be through any control mechanism available to communicate between the base station and the mobile device. The particular communication mechanism depends on the particular RF technology deployed. The control logic (SINR control logic 407 in FIG. 4) responds to the received code, by having the mobile device acknowledge receipt of the adaptive SINR control instruction, which is received by the base station in 607, and reduce the signal strength of the received signal. The base station then transmits the desired signal with increased transmission power in 609. If the mobile device does not support adaptive SINR control, the mobile device can acknowledge with that information or not acknowledge at all. In either case, the base station can exit the SINR control process if the mobile device does not support adaptive SINR control. As described above, the adaptive RF signal reduction can be realized either by an adaptive antenna gain reduction or by an adaptive receiving attenuation at the RF front end of the mobile device. At this point, the receiving SINR remains unchanged since both desired signal and undesired signal are attenuated by the same $X_1$ dB amount. Meanwhile, when the mobile receiver attenuates $X_1$ dB in its received signal, the base station, which transmits desired signal, raises its session EiRP by $X_2$ dB so that the net improvement in received SINR at the mobile device is $X_2$ dB.

The above described SINR control process is coordinated by control processes running in both base station and mobile receiving device. In an embodiment of the invention, during the process of adaptive SINR control process, the $X_1$ dB attenuation is only inserted in this particular mobile receiver for this particular data/voice session, and the $X_2$ dB increment of transmitted power is only transmitted to this special data/voice session. This adaptive SINR improvement and its related adjustment impact are controlled during an individual data session using management message exchanges between a designated communication pair (base station and receiver). This adaptive control is effective and also creates less impact to other on-going data sessions with cost at minimum to the rest of the system.

Adaptive control of the receiving SINR at the device level helps make diversified RF service systems run more successfully together. The adaptive SINR control process described herein supports an effective RF system planning before the deployment and also adjusts the operation properly in real-time. The adaptive SINR control process described herein also contributes to an automatic session breathing and session Quality of Service (QoS) adjustment. It enhances the field network operation, improves the session QoS in real-time operation and supports the efforts from the network planning.

Adaptive SINR control may be planned into system deployment. For example, during a mobile broadband service system design, the system engineer will specify a cluster of base stations with the identification of any potential RF impact from a neighboring system in location and/or in frequency range. Installing adaptive control in a limited number of base stations minimizes costs by allowing less expensive transmit amplifiers to be used in areas where high powered interference is not expected. When the RF interference issues become more severe or the adaptive SINR control process described herein becomes less costly, adaptive receiving SINR control can be installed in additional or even all base stations so that the pre-identification of impact sites will become unnecessary.

For those base stations that have implemented the adaptive SINR control described herein, the control process is enabled. Handsets or other mobile devices that include RF attenuation hardware and loaded controlled software to run the adaptive SINR control process interact with enabled base stations to implement the adaptive SINR control process.

Once the mobile device enters the service coverage specified or detects BLER increase and/or SINR drop, and/or an increased received signal, adaptive SINR control is turned on In one embodiment, base station instructs the mobile device to attenuate all receiving signal by $X_1$ dB so that both received service signal and interference level will be reduced by the same amount. Meanwhile, the base station will increase its transmitted power by $X_2$ dB through its continuous quality monitoring through a connected user session. According to this process, the SINR in the receiving mobile device will be improved by $X_2$ dB at the network expense of raising $X_2$ dB in transmitted signal to this individual mobile device. Alternatively, once the handset detects the presence of interference, the handset initiates the insertion of attenuation into the RF receive chain, or otherwise reduces the received signal strength, and then requests additional transmit power from its associated base station.

The description of the invention set forth herein is illustrative, and is not intended to limit the scope of the invention as set forth in the following claims. For example, while several approaches have been described to reducing the signal level of the received signal, other approaches, and variations and modifications of the embodiments disclosed herein may be made based on the description set forth herein, without departing from the scope and spirit of the invention as set forth in the following claims.

What is claimed is:

1. A method for adaptive signal to interference plus noise ratio (SINR) control comprising:
    sending control information from a base station to a mobile device requesting that the mobile device reduce a signal level of a signal in a receive path of the mobile device after the signal is received by the mobile device, the signal including a desired signal and an interfering signal; and
    subsequently increasing transmission power in the base station of the desired signal.

2. The method as recited in claim 1 further comprising:
    the base station receiving from the mobile device an indication of quality in a previous signal received by the mobile device; and
    determining based on the indication of quality, presence of interference in the previous signal received by the mobile device from the interfering signal and sending the control information to the mobile device based thereon.

3. The method as recited in claim 2 wherein the indication of quality includes a block error rate (BLER).

4. The method as recited in claim 2 wherein the indication of quality includes a signal to noise ratio.

5. The method as recited in claim 2 wherein the indication of quality includes a signal level indication of the desired signal.

6. The method as recited in claim 1 further comprising the mobile device reducing the signal level of the signal after the signal is received by the mobile device in response to the control information.

7. The method as recited in claim 1 further comprising the base station increasing the transmission power of the desired signal for a communication session associated with the mobile device without affecting power levels of other communication sessions being undertaken by the base station with other mobile devices.

8. The method as recited in claim 1 wherein the control information specifies an amount by which to attenuate, in the mobile device, the signal after the signal is received by the mobile device.

9. The method as recited in claim 1 further comprising the mobile device reducing the signal level by at least one of attenuating the signal in an attenuator after receipt by an antenna of the mobile device or reducing an amplifier gain of an amplifier in a receiver of the mobile device.

10. A method for adaptive signal to interference plus noise ratio (SINR) control comprising:
    sending control information from a base station to a mobile device requesting that the mobile device reduce a signal level of a signal in a receive path of the mobile device after the signal is received by the mobile device, the signal including a desired signal and an interfering signal;
    subsequently increasing transmission power in the base station of the desired signal; and wherein the base station sends the control information to the mobile device responsive to geographic location of the base station in proximity to a known stationary interfering transmitter transmitting the interfering signal.

11. The method as recited in claim 10 wherein the base station sends the control information to the mobile device as a code indicating presence of one or more stationary interfering transmitters.

12. The method as recited in claim 11 wherein the base station subsequently increases the transmission power in response to acknowledgement by the mobile device of the code.

13. A system comprising:
   a base station configured to send a communication to a mobile device requesting that the mobile device reduce in a receive path of the mobile device a signal level of a signal to be received by the mobile device, the signal to be received including a desired signal transmitted by the base station and an interfering signal; and
   the base station being further configured to subsequently increase transmission power of the desired signal.

14. The system as recited in claim 13 wherein the base station is configured to send the communication to the mobile device responsive to geographic location of the base station in proximity to a known stationary interfering transmitter transmitting the interfering signal.

15. The system as recited in claim 13 wherein the base station is configured to send the communication based on an indication of received signal quality received from the mobile device.

16. The system as recited in claim 15 wherein the indication of received signal quality includes a block error rate (BLER).

17. The system as recited in claim 15 wherein the indication of received signal quality includes a signal to noise ratio.

18. The system as recited in claim 15 wherein the indication of received signal quality includes a signal level indication of the desired signal.

19. The system as recited in claim 13 wherein the base station is configured to increase transmission power for a communication session associated with the mobile device without affecting power levels of any other communication sessions being undertaken by the base station with other mobile devices.

20. The system as recited in claim 13 further comprising:
   the mobile device including a receiver control circuit configured to reduce the signal level of the signal responsive to the communication to the mobile device requesting that the mobile device reduce the signal level.

21. The system as recited in claim 13 wherein the communication to the mobile device specifies an amount by which to attenuate the signal.

* * * * *